US012236729B2

(12) United States Patent
Maya

(10) Patent No.: US 12,236,729 B2
(45) Date of Patent: Feb. 25, 2025

(54) INFORMATION PROCESSING SYSTEM, STORAGE MEDIUM, AND INFORMATION PROCESSING METHOD

(71) Applicant: TOYOTA JIDOSHA KABUSHIKI KAISHA, Toyota (JP)

(72) Inventor: Tomokazu Maya, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 373 days.

(21) Appl. No.: 17/959,672

(22) Filed: Oct. 4, 2022

(65) Prior Publication Data

US 2023/0154247 A1 May 18, 2023

(30) Foreign Application Priority Data

Nov. 12, 2021 (JP) ................................ 2021-185131

(51) Int. Cl.
*G07C 5/04* (2006.01)
*G07C 5/00* (2006.01)

(52) U.S. Cl.
CPC ..................................... *G07C 5/04* (2013.01)

(58) Field of Classification Search
USPC ........................................................ 701/32.1
See application file for complete search history.

(56) References Cited

U.S. PATENT DOCUMENTS 6,840,445 B2 * 1/2005 Gatz .................. G06K 17/0029 701/29.6
2010/0324803 A1 * 12/2010 Sugiyama ............ F02D 41/221 701/106
2012/0232764 A1 * 9/2012 Inagawa ............... F16H 63/502 701/55
2015/0228131 A1 * 8/2015 Hayashi .................. B60R 16/02 701/29.1
2015/0248794 A1 * 9/2015 Hashimoto ............. F01N 9/007 701/50
2016/0093120 A1 * 3/2016 Tanaka ................... G07C 5/008 701/29.1

FOREIGN PATENT DOCUMENTS

JP 2009-074486 A 4/2009
JP 2021032120 A * 3/2021

* cited by examiner

*Primary Examiner* — Adam D Tissot
(74) *Attorney, Agent, or Firm* — Sughrue Mion, PLLC

(57) ABSTRACT

An information processing system includes a vehicle and an information processing apparatus. The vehicle includes a first component including a measuring unit configured to measure a first number of operations of the first component, a second component of which a second number of operations is measured by the measuring unit, and a controller configured to send the first and second numbers of operations to the information processing apparatus. The information processing apparatus includes a storage unit and a control unit. The storage unit stores a first cumulative number of operations of the first component and a second cumulative number of operations of the second component. The control unit is configured to determine whether the first and second components have been replaced based on the first and second numbers of operations, and update the first and second cumulative numbers of operations in a procedure that varies according to a determination result.

20 Claims, 7 Drawing Sheets

FIG. 5A

| | | NUMBER OF OPERATIONS |
|---|---|---|
| FIRST COMPONENT | COMPONENT A | 6500 |
| SECOND COMPONENT | COMPONENT B | 12000 |
| | COMPONENT C | 7800 |
| | COMPONENT D | 15000 |

FIG. 5B

| | | NUMBER OF OPERATIONS |
|---|---|---|
| FIRST COMPONENT | COMPONENT A | 100 |
| SECOND COMPONENT | COMPONENT B | 200 |
| | COMPONENT C | 150 |
| | COMPONENT D | 300 |

FIG. 5C

| | | CUMULATIVE NUMBER OF OPERATIONS |
|---|---|---|
| FIRST COMPONENT | COMPONENT A | 100 |
| SECOND COMPONENT | COMPONENT B | 12200 |
| | COMPONENT C | 7950 |
| | COMPONENT D | 15300 |

FIG. 5D

| | | NUMBER OF OPERATIONS |
|---|---|---|
| FIRST COMPONENT | COMPONENT A | 6600 |
| SECOND COMPONENT | COMPONENT B | 12200 |
| | COMPONENT C | 7950 |
| | COMPONENT D | 300 |

FIG. 5E

| | | CUMULATIVE NUMBER OF OPERATIONS |
|---|---|---|
| FIRST COMPONENT | COMPONENT A | 6600 |
| SECOND COMPONENT | COMPONENT B | 12200 |
| | COMPONENT C | 7950 |
| | COMPONENT D | 300 |

INFORMATION PROCESSING SYSTEM, STORAGE MEDIUM, AND INFORMATION PROCESSING METHOD

CROSS-REFERENCE TO RELATED APPLICATION

This application claims priority to Japanese Patent Application No. 2021-185131 filed on Nov. 12, 2021, incorporated herein by reference in its entirety.

BACKGROUND

1. Technical Field

The disclosure relates to an information processing system, a storage medium, and an information processing method.

2. Description of Related Art

There is known a technology for determining when to replace a component of a vehicle.

For example, Japanese Unexamined Patent Application Publication No. 2009-74486 (JP 2009-74486 A) describes a method of determining engine maintenance timing based on a cumulative value of engine load by using cumulative load-damage characteristics obtained in advance and showing the relationship between a cumulative load point, obtained by accumulating an engine load, and a damage point.

SUMMARY

As another method of determining when to replace a component of a vehicle, there is a method of determining when to replace a component based on a travel distance and elapsed years. However, with this method, a component that has not deteriorated so much can be replaced, which can lead to an increased cost in maintenance.

There has been room for improvement in the technology for determining when to replace a component of a vehicle.

The disclosure provides a technology for appropriately determining when to replace a component of a vehicle.

An aspect of the disclosure relates to an information processing system. The information processing system includes a vehicle and an information processing apparatus. The vehicle includes a first component including a measuring unit configured to measure the number of operations of the first component, at least one second component of which the number of operations is measured by the measuring unit of the first component, and a controller configured to send a first number of operations indicating the number of operations of the first component and a second number of operations indicating the number of operations of the at least one second component to the information processing apparatus. The information processing apparatus includes a storage unit and a control unit. The storage unit is configured to store a first cumulative number of operations indicating a cumulative number of operations of the first component and a second cumulative number of operations indicating a cumulative number of operations of the at least one second component. The control unit is configured to update the first cumulative number of operations and the second cumulative number of operations, stored in the storage unit, in a procedure that varies according to the first cumulative number of operations and the second cumulative number of operations, acquired from the vehicle.

Another aspect of the disclosure relates to a storage medium storing a program. The program is used in an information processing system including a vehicle and an information processing apparatus. The vehicle includes a first component including a measuring unit configured to measure the number of operations of the first component, and at least one second component of which the number of operations is measured by the measuring unit of the first component. The program causes a computer to execute functions. The functions include storing a first cumulative number of operations indicating a cumulative number of operations of the first component and a second cumulative number of operations indicating a cumulative number of operations of the at least one second component, acquiring a first number of operations indicating the number of operations of the first component and a second number of operations indicating the number of operations of the at least one second component from the vehicle, determining whether the first component and the at least one second component have been replaced based on the first number of operations and the second number of operations, acquired from the vehicle, and updating the first cumulative number of operations and the second cumulative number of operations, stored in the storage unit, in a procedure that varies according to a result of the determination.

Further another aspect of the disclosure relates to an information processing method. The information processing method is used in an information processing system including a vehicle and an information processing apparatus. The vehicle includes a first component including a measuring unit configured to measure the number of operations of the first component, and at least one second component of which the number of operations is measured by the measuring unit of the first component. The information processing method includes storing a first cumulative number of operations indicating a cumulative number of operations of the first component and a second cumulative number of operations indicating a cumulative number of operations of the at least one second component, acquiring a first number of operations indicating the number of operations of the first component and a second number of operations indicating the number of operations of the at least one second component from the vehicle, determining whether the first component and the at least one second component have been replaced based on the first number of operations and the second number of operations, acquired from the vehicle, and updating the first cumulative number of operations and the second cumulative number of operations, stored in the storage unit, in a procedure that varies according to a result of the determination.

According to the aspects of the disclosure, it is possible to appropriately determine when to replace a component of a vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5A is a table showing an example of the number of operations;

FIG. 5B is a table showing an example of the number of operations when a first component has been replaced;

FIG. 5C is a table showing an example of the cumulative number of operations updated when the first component has been replaced;

FIG. 5D is a table showing an example of the number of operations when a second component has been replaced;

FIG. 5E is a table showing an example of the cumulative number of operations updated when the second component has been replaced;

DETAILED DESCRIPTION OF EMBODIMENTS

Hereinafter, an embodiment of the disclosure will be described with reference to the accompanying drawings.

Figure 1:
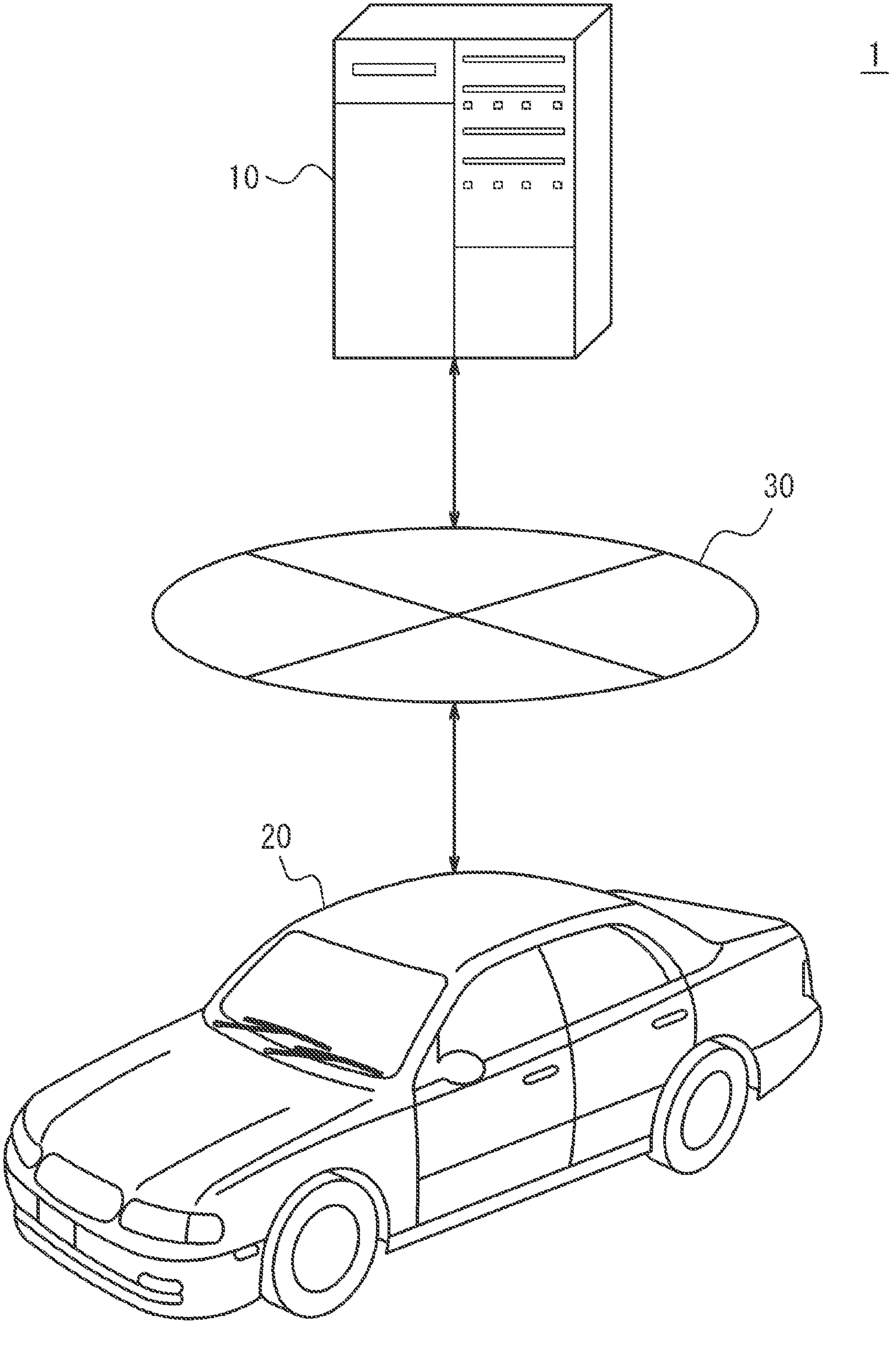
FIG. 1 is a diagram showing the configuration of an information processing system according to an embodiment of the disclosure.

FIG. 1 is a diagram showing the configuration of an information processing system 1 according to the embodiment of the disclosure. As shown in FIG. 1, the configuration and outline of the information processing system 1 according to the embodiment of the disclosure will be described.

The information processing system 1 includes an information processing apparatus 10 and a vehicle 20. The information processing apparatus 10 and the vehicle 20 are connected via a network 30 so as to be able to communicate with each other. The network 30 may be a network including a mobile communication network, the Internet, and the like.

In FIG. 1, the number of information processing apparatuses 10 and the number of vehicles 20 each are one. Alternatively, the number of information processing apparatuses 10 and the number of vehicles 20 each may be two or more.

The information processing apparatus 10 is, for example, a dedicated computer configured to function as a server. The information processing apparatus 10 may be a general-purpose personal computer (PC). The information processing apparatus 10 is able to communicate with the vehicle 20 via the network 30.

The vehicle 20 is a vehicle of a selected type, such as a gasoline vehicle, a diesel vehicle, a hybrid electric vehicle (HEV), a plug-in hybrid electric vehicle (PHEV), a battery electric vehicle (BEV), and a fuel cell electric vehicle (FCEV). The vehicle 20 may be automatically driven at a selected level. An automation level is, for example, any one of level 1 to level 5 in Society of Automotive Engineers (SAE) levels. The vehicle 20 is able to communicate with the information processing apparatus 10 via the network 30.

The information processing apparatus 10 stores the cumulative numbers of operations of components of the vehicle 20. The vehicle 20 measures the numbers of operations of the components of the vehicle 20 and sends the measured numbers of operations to the information processing apparatus 10. The information processing apparatus 10 updates the stored cumulative numbers of operations based on the numbers of operations of the components of the vehicle 20, acquired from the vehicle 20.

Figure 2:
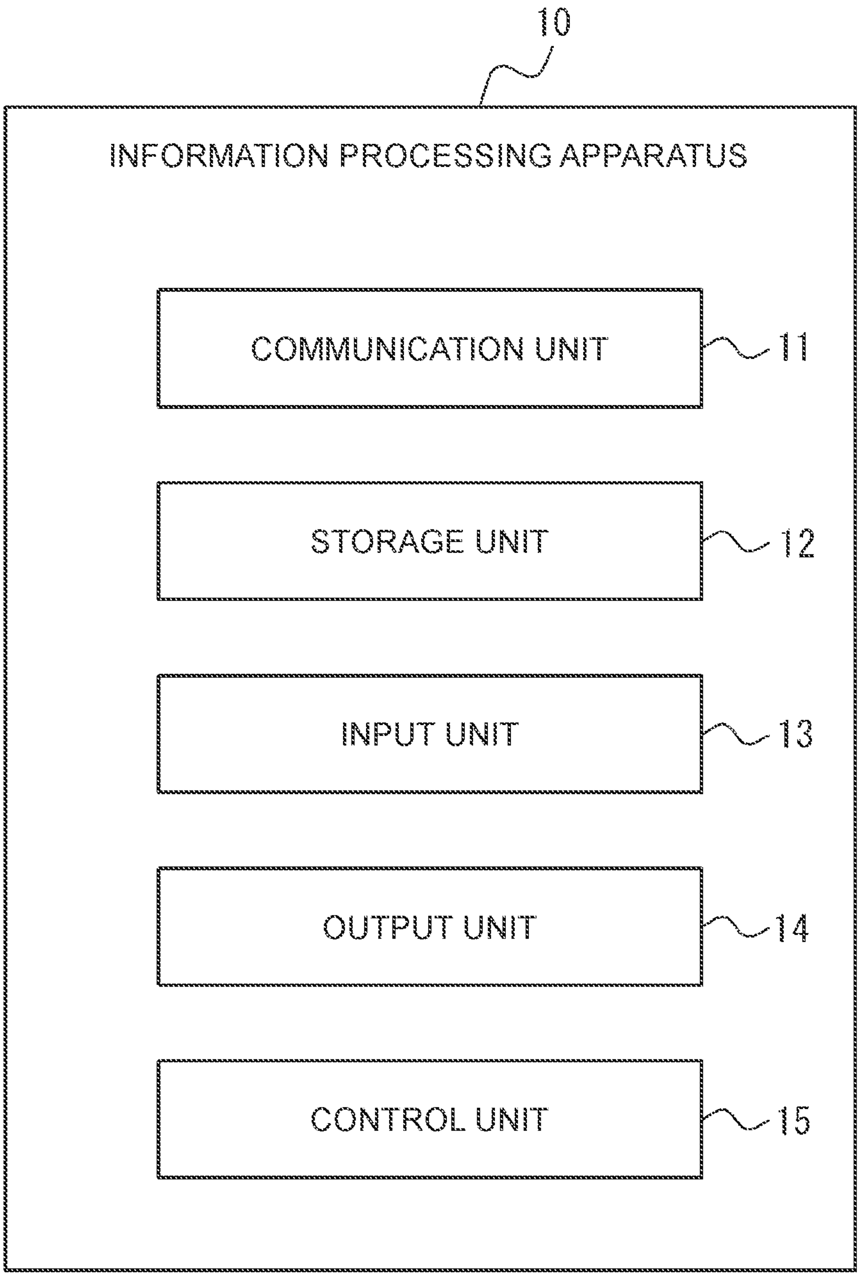
FIG. 2 is a block diagram showing the configuration of an information processing apparatus according to the embodiment of the disclosure.

The configuration of the information processing apparatus 10 according to the embodiment of the disclosure will be described with reference to FIG. 2.

The information processing apparatus 10 includes a communication unit 11, a storage unit 12, an input unit 13, an output unit 14, and a control unit 15.

The communication unit 11 includes a communication module that connects with the network 30. For example, the communication unit 11 may include a communication module that supports a local area network (LAN). In one embodiment, the information processing apparatus 10 is connected to the network 30 via the communication unit 11. The communication unit 11 sends and receives various pieces of information via the network 30. The communication unit 11 is able to communicate with the vehicle 20 via the network 30.

The storage unit 12 is, for example, a semiconductor memory, a magnetic memory, an optical memory, or the like; however, the storage unit 12 is not limited thereto. The storage unit 12 may function as, for example, a main storage device, an auxiliary storage device, or a cache memory. The storage unit 12 stores selected information used in the operation of the information processing apparatus 10. For example, the storage unit 12 may store various pieces of information and the like received by a system program, an application program, and the communication unit 11. Information stored in the storage unit 12 may be able to be updated with, for example, information received from the network 30 via the communication unit 11. Part of the storage unit 12 may be installed outside the information processing apparatus 10. In this case, part of the storage unit 12, installed outside, may be connected to the information processing apparatus 10 via a selected interface.

The input unit 13 includes one or more input interfaces that detect user input and acquire input information based on user's operation. Examples of the input unit 13 include a physical key, a capacitance key, a touch screen integrated with a display of the output unit 14, and a microphone that receives voice input; however, the input unit 13 is not limited thereto.

The output unit 14 includes one or more output interfaces that output information to notify a user. Examples of the output unit 14 include a display that outputs information by image, and a speaker that outputs information by voice; however, the output unit 14 is not limited thereto.

The control unit 15 includes at least one processor, at least one dedicated circuit, or any combination of them. The processor is a general-purpose processor, such as a central processing unit (CPU) and a graphics processing unit (GPU), or a special-purpose processor specialized in a specific process. The dedicated circuit is, for example, a field-programmable gate array (FPGA) or an application specific integrated circuit (ASIC). The control unit 15 executes a process related to the operation of the information processing apparatus 10 while controlling the units of the information processing apparatus 10.

Figure 3:
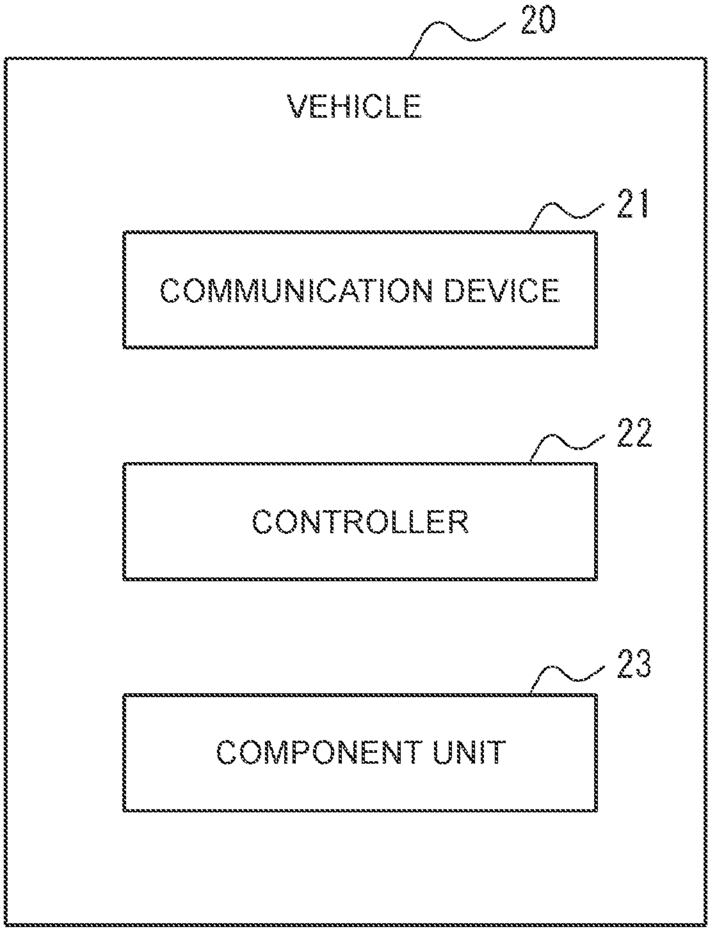
FIG. 3 is a block diagram showing the configuration of a vehicle according to the embodiment of the disclosure.

The configuration of the vehicle 20 according to the embodiment of the disclosure will be described with reference to FIG. 3.

The vehicle 20 includes a communication device 21, a controller 22, and a component unit 23. The communication device 21, the controller 22, and the component unit 23 are connected to one another via, for example, an in-vehicle network, such as a controller area network (CAN), or a dedicated line so as to be able to communicate with one another.

The communication device 21 includes a communication module that connects with the network 30. The communication device 21 may include a communication module that supports mobile communication standards, such as Long Term Evolution (LTE), 4th Generation (4G), and 5th Generation (5G). The vehicle 20 is connected to the network 30 via the communication device 21. The communication device 21 sends and receives various pieces of information via the network 30. The communication device 21 is able to communicate with the information processing apparatus 10 via the network 30.

The controller 22 includes at least one processor, at least one dedicated circuit, or any combination of them. The processor is, for example, a general-purpose processor, such as a CPU and a GPU, or a special-purpose processor specialized in a specific process. The dedicated circuit is, for example, an FPGA or an ASIC. The controller 22 executes a process related to the operation of the vehicle 20 while controlling the units of the vehicle 20.

The component unit 23 is a collection of components that implement a specific function. In FIG. 3, one component unit 23 is shown. Alternatively, the vehicle 20 may include two or more component units 23. The component unit 23 may be, for example, a power slide door or the like.

Figure 4:
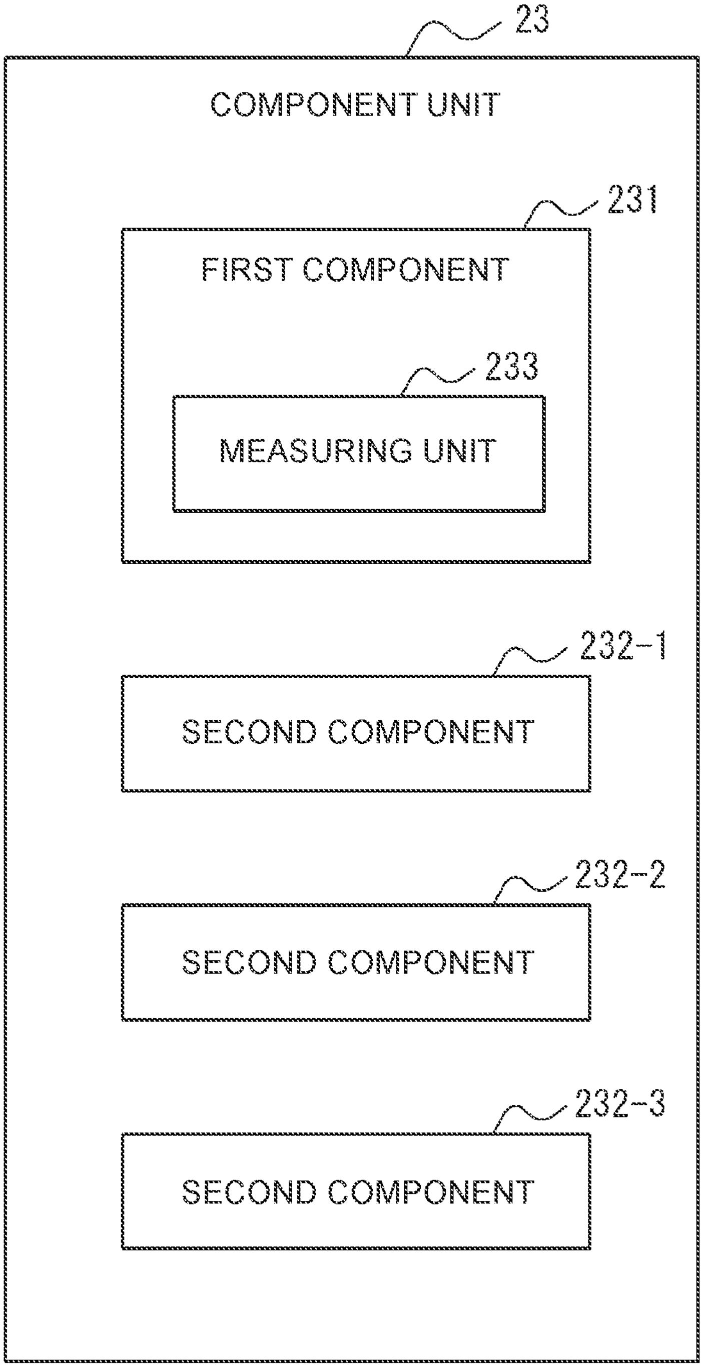
FIG. 4 is a block diagram showing an example of the configuration of a component unit according to the embodiment of the disclosure.

As shown in FIG. 4, the component unit 23 includes a first component 231, and second components 232-1, 232-2, 232-3. Hereinafter, when the second components 232-1, 232-2, 232-3 do not need to be distinguished from one another, the second components 232-1, 232-2, 232-3 may be simply referred to as the second components 232.

FIG. 4 shows the case where the component unit 23 includes three second components 232-1, 232-2, 232-3; however, the number of the second components 232 provided in the component unit 23 is not limited thereto. The component unit 23 just needs to include one or more selected number of the second components 232.

When the component unit 23 is a power slide door, the first component 231 may be, for example, an actuator. In addition, when the component unit 23 is a power slide door, the second components 232 may be, for example, a door closer and the like.

The first component 231 includes a measuring unit 233. The measuring unit 233 measures the number of operations of the first component 231. The number of operations of the first component 231, to be measured by the measuring unit 233, is the number of times the first component 231 is operated from when the first component 231 is installed in the vehicle 20 to the time of measurement. When the first component 231 has been replaced, the measuring unit 233 resets the number of operations of the first component 231.

Each of the second components 232 differs from the first component 231 and does not include the measuring unit 233. The number of operations of each second component 232 is measured by the measuring unit 233 of the first component 231. In the case of the configuration shown in FIG. 4, the measuring unit 233 of the first component 231 measures the number of operations of each of the second components 232-1, 232-2, 232-3.

The number of operations of each second component 232, to be measured by the measuring unit 233, is the number of times the second component 232 is operated from when the second component 232 is installed to the time of measurement. When the second component 232 has been replaced, the measuring unit 233 resets the number of operations of the second component 232.

For example, when the second component 232-1 has been replaced and the second components 232-2, 232-3 have not been replaced, the measuring unit 233 resets the number of operations of the second component 232-1 and does not reset the number of operations of each of the second components 232-2, 232-3.

When the first component 231 has been replaced, the measuring unit 233 of the replaced first component 231 resets the number of operations of each of the second components 232 even when the second component 232 has not been replaced.

Operation of Information Processing System

The operation of the information processing system 1 shown in FIG. 1 will be described with reference to FIG. 2 to FIG. 4.

As shown in FIG. 4, the component unit 23 of the vehicle 20 includes the first component 231 and the second components 232.

The measuring unit 233 of the first component 231 periodically measures the number of operations of the first component 231. The measuring unit 233 periodically measures the number of operations of each of the second components 232. Hereinafter, the number of operations of the first component 231, measured by the measuring unit 233, is also referred to as "first number of operations". In addition, the number of operations of each of the second components 232, measured by the measuring unit 233, is also referred to as "second number of operations".

The controller 22 of the vehicle 20 periodically sends the first number of operations and the second numbers of operations, measured by the measuring unit 233, to the information processing apparatus 10 via the communication device 21. The controller 22 may, for example, send the first number of operations and the second numbers of operations once a day to the information processing apparatus 10 via the communication device 21.

The communication unit 11 of the information processing apparatus 10 receives the first number of operations and the second numbers of operations, sent from the vehicle 20. The control unit 15 acquires the first number of operations and the second numbers of operations, sent from the vehicle 20, via the communication unit 11.

The storage unit 12 stores the cumulative number of operations of the first component 231 and the cumulative numbers of operations of the second components 232. Hereinafter, the cumulative number of operations of the first component 231, stored in the storage unit 12, is also referred to as "first cumulative number of operations". In addition, the cumulative number of operations of each of the second components 232, stored in the storage unit 12, is also referred to as "second cumulative number of operations".

The control unit 15 determines whether any one of the first component 231 and the second components 232 has been replaced based on the first number of operations and the second numbers of operations, acquired from the vehicle 20. The control unit 15 updates the first cumulative number of operations and the second cumulative numbers of operations, stored in the storage unit 12, in a procedure that varies according to the result of the determination. The determination process and the update process that are executed by the control unit 15 will be described in detail with reference to FIG. 5A to FIG. 5E.

Hereinafter, the description will be made on the assumption that the vehicle 20 includes components A, B, C, D. The component A is the first component 231. In other words, the component A includes the measuring unit 233. The components B, C, D are the second components 232. In other words, the components B, C, D each do not include the measuring unit 233.

FIG. 5A shows the numbers of operations of the components A, B, C, D, measured by the measuring unit 233 of the component A at certain timing. The controller 22 of the vehicle 20 sends the numbers of operations of the components A, B, C, D shown in FIG. 5A and measured by the measuring unit 233 to the information processing apparatus 10 via the communication device 21.

The control unit 15 of the information processing apparatus 10 acquires the numbers of operations of the components A, B, C, D shown in FIG. 5A via the communication device 21. The control unit 15 updates the first cumulative number of operations and the second cumulative numbers of operations, stored in the storage unit 12, with the acquired values of the numbers of operations.

FIG. 5B shows the numbers of operations of the components A, B, C, D, measured by the measuring unit 233 of the component A, at the timing subsequent to the timing at which the numbers of operations shown in FIG. 5A are measured. The numbers of operations of the components A, B, C, D shown in FIG. 5B are respectively less than the numbers of operations of the components A, B, C, D shown in FIG. 5A. This means that the component A that is the first component 231 has been replaced. This is because, when the component A that is the first component 231 has been replaced, the number of operations of the component A is reset, and the numbers of operations of the components B, C, D, measured by the measuring unit 233 of the component A, are also reset.

When the control unit 15 of the information processing apparatus 10 acquires the numbers of operations shown in FIG. 5B, the control unit 15 compares the numbers of operations acquired this time with the numbers of operations acquired last time, respectively. Here, the numbers of operations acquired this time are the numbers of operations shown in FIG. 5B, and the numbers of operations acquired last time are the numbers of operations shown in FIG. 5A.

As shown in FIG. 5A and FIG. 5B, in each of the components A, B, C, D, the number of operations acquired this time is less than the number of operations acquired last time. In other words, for the first number of operations that is the number of operations of the component A, the first number of operations acquired this time is less than the first number of operations acquired last time. In addition, for the second numbers of operations that are the numbers of operations of the components B, C, D, the second numbers of operations acquired this time are respectively less than the second numbers of operations acquired last time. In this case, the control unit 15 determines that the component A that is the first component 231 has been replaced.

In this case, although the components B, C, D have not been replaced, the numbers of operations of the components B, C, D are reset because the component A has been replaced. Therefore, if the cumulative numbers of operations stored in the storage unit 12 are updated with the numbers of operations acquired this time, the cumulative numbers of operations of the components B, C, D are reset although the components B, C, D have not been replaced. To prevent this situation, when the control unit 15 determines that the first component 231 has been replaced, the control unit 15 updates the first cumulative number of operations and the second cumulative numbers of operations, stored in the storage unit 12, as follows.

When the control unit 15 determines that the first component 231 has been replaced, the control unit 15 updates the first cumulative number of operations with the first number of operations acquired this time. In addition, when the control unit 15 determines that the first component 231 has been replaced, the control unit 15 updates the second cumulative numbers of operations by respectively adding the second numbers of operations acquired this time to the second cumulative numbers of operations, stored in the storage unit 12. Hereinafter, such an update procedure may be referred to as "first procedure".

FIG. 5C is a table showing the cumulative numbers of operations, updated after the control unit 15 acquires the numbers of operations shown in FIG. 5B. As shown in FIG. 5C, for the component A that is the first component 231, the control unit 15 updates the first cumulative number of operations with 100 that is the first number of operations acquired this time. For the component B that is the second component 232, the control unit 15 adds 200 that is the second number of operations acquired this time to 12000 that is the second cumulative number of operations stored in the storage unit 12 and updates the second cumulative number of operations stored in the storage unit 12 to 12200. For the component C that is the second component 232, the control unit 15 adds 150 that is the second number of operations acquired this time to 7800 that is the second cumulative number of operations stored in the storage unit 12 and updates the second cumulative number of operations stored in the storage unit 12 to 7950. For the component D that is the second component 232, the control unit 15 adds 300 that is the second number of operations acquired this time to 15000 that is the second cumulative number of operations stored in the storage unit 12 and updates the second cumulative number of operations stored in the storage unit 12 to 15300.

In this way, when the first component 231 has been replaced, for each of the second components 232, the second number of operations acquired this time is added to the second cumulative number of operations stored in the storage unit 12, and the second cumulative number of operations is updated. Therefore, an actual cumulative number of operations of the second component 232 is stored in the storage unit 12.

Subsequently, the case where the measuring unit 233 of the component A measures the numbers of operations shown in FIG. 5D at the timing subsequent to the timing at which the numbers of operations shown in FIG. 5A are measured will be described as an example.

As shown in FIG. 5D, the numbers of operations of the components A, B, C are respectively greater than the numbers of operations of the components A, B, C shown in FIG. 5A. On the other hand, the number of operations of the component D is less than the number of operations of the component D shown in FIG. 5A. This means that the component D that is the second component 232 has been replaced. This is because, when the component D that is the second component 232 has been replaced, the measuring unit 233 of the component A resets the number of operations of the component D.

When the control unit 15 of the information processing apparatus 10 acquires the numbers of operations shown in FIG. 5D, the control unit 15 compares the numbers of operations acquired this time with the numbers of operations acquired last time, respectively. Here, the numbers of operations acquired this time are the numbers of operations shown in FIG. 5D, and the numbers of operations acquired last time are the numbers of operations shown in FIG. SA.

As shown in FIG. 5A and FIG. 5D, in the component A that is the first component 231, the number of operations acquired this time is greater than the number of operations acquired last time. In the component D that is the second component 232, the number of operations acquired this time is less than the number of operations acquired last time. In this way, when, of the second components 232, there is the second component 232 of which the second number of operations acquired this time is less than the second number of operations acquired last time as in the case of the component D and the first number of operations acquired this time is greater than the first number of operations acquired last time, the control unit 15 determines that the component D that is the second component 232 has been replaced.

In this case, since the cumulative number of operations stored in the storage unit 12 just needs to be updated with the number of operations acquired this time, when the control unit 15 determines that any one of the second components 232 has been replaced, the control unit 15 updates the first cumulative number of operations and the second cumulative numbers of operations, stored in the storage unit 12, as follows.

When the control unit 15 determines that any one of the second components 232 has been replaced, the control unit 15 updates the first cumulative number of operations with the first number of operations acquired this time. In addition, when the control unit 15 determines that any one of the second components 232 has been replaced, the control unit 15 updates the second cumulative numbers of operations with the second numbers of operations acquired this time, respectively. Hereinafter, such an update procedure may be referred to as "second procedure".

FIG. 5E shows the cumulative numbers of operations, updated after the control unit 15 acquires the numbers of operations shown in FIG. 5D. As shown in FIG. 5E, the first cumulative number of operations and the second cumulative numbers of operations, stored in the storage unit 12, are the first number of operations and the second numbers of operations, shown in FIG. 5D, and are updated without any change.

The storage unit 12 stores information on durability values for the first component 231 and the second components 232. A durability value represents the number of operations the first component 231 or the second component 232 is able to be used normally.

For example, the storage unit 12 may store the following values as the durability values of the components A, B, C, D.

The durability value of the component A: 7500
The durability value of the component B: 20000
The durability value of the component C: 20000
The durability value of the component D: 20000

The control unit 15 determines when to replace the first component 231 by comparing the first cumulative number of operations of the first component 231 with the durability value of the first component 231. The control unit 15 determines when to replace the second component 232 by comparing the second cumulative number of operations of the second component 232 with the durability value of the second component 232.

The control unit 15 may estimate the first cumulative number of operations at the time of inspection of the vehicle 20 next, next time and determine when to replace the first component 231 by comparing the estimated first cumulative number of operations with the durability value of the first component 231. For example, when the control unit 15 determines that the first cumulative number of operations estimated as the first cumulative number of operations at the time of inspection of the vehicle 20 next, next time is greater than or equal to the durability value of the first component 231, the control unit 15 may determine that the time to inspect the vehicle 20 next time is the time to replace the first component 231.

Similarly, the control unit 15 may estimate the second cumulative number of operations at the time of inspection of the vehicle 20 next, next time and determine when to replace the second component 232 by comparing the estimated second cumulative number of operations with the durability value of the second component 232. For example, when the control unit 15 determines that the second cumulative number of operations estimated as the second cumulative number of operations at the time of inspection of the vehicle 20 next, next time is greater than or equal to the durability value of the second component 232, the control unit 15 may determine that the time to inspect the vehicle 20 next time is the time to replace the second component 232.

For example, in the case where the cumulative numbers of operations are the numbers of operations as shown in FIG. 5E, when the control unit 15 estimates that the cumulative number of operations of the component A at the time of inspection of the vehicle 20 next, next time is greater than or equal to 7500, the control unit 15 determines that the time to replace the component A is the time to inspect the vehicle 20 next time. When the control unit 15 estimates that the cumulative number of operations of the component B at the time of inspection of the vehicle 20 next, next time is less than 20000, the control unit 15 determines that the component B does not need to be replaced at the time of inspection of the vehicle 20 next time. When the control unit 15 estimates that the cumulative number of operations of the component C at the time of inspection of the vehicle 20 next, next time is less than 20000, the control unit 15 determines that the component C does not need to be replaced at the time of inspection of the vehicle 20 next time. When the control unit 15 estimates that the cumulative number of operations of the component D at the time of inspection of the vehicle 20 next, next time is less than 20000, the control unit 15 determines that the component D does not need to be replaced at the time of inspection of the vehicle 20 next time.

The control unit 15 may send the results of determination on when to replace the first component 231 and the second components 232 to a terminal apparatus or the like of the user of the vehicle 20 via the communication unit 11. Thus, the user of the vehicle 20 is able to determine which component needs to be replaced at the time of inspection of the vehicle 20 next time.

Figure 6:
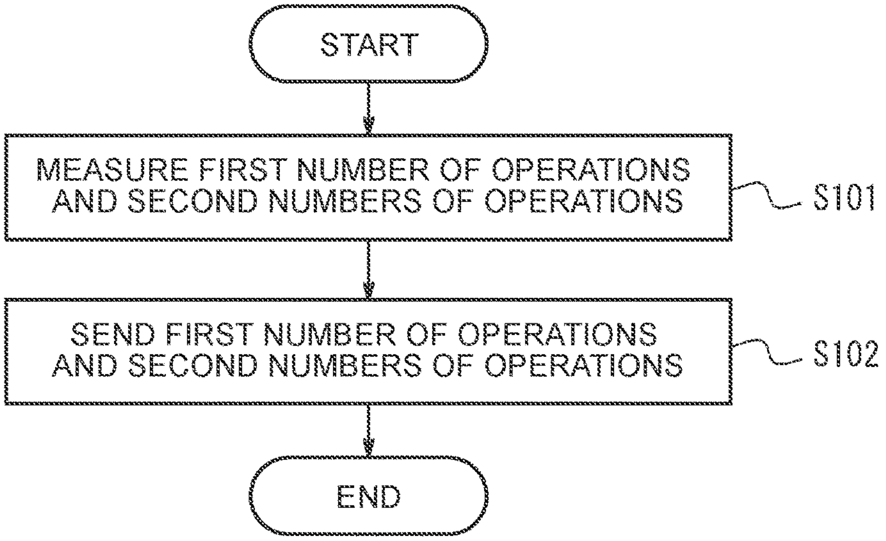
FIG. 6 is a flowchart showing the operation of the information processing system according to the embodiment of the disclosure.
Figure 7:
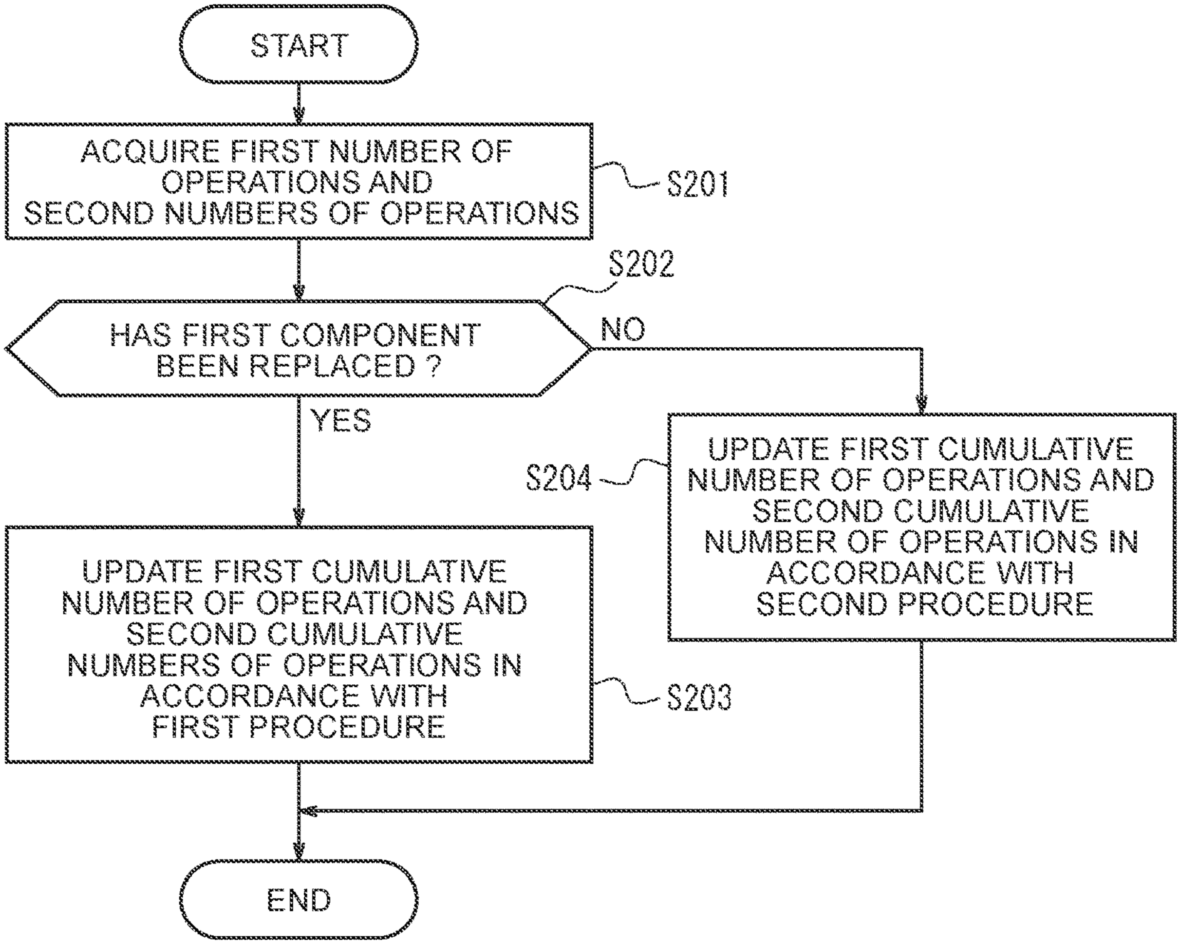
FIG. 7 is a flowchart showing the operation of the information processing system according to the embodiment of the disclosure.

The operation of the information processing system 1 will be described with reference to the flowcharts shown in FIG. 6 and FIG. 7. FIG. 6 is a flowchart mainly showing the operation of the vehicle 20. FIG. 7 is a flowchart mainly showing the operation of the information processing apparatus 10.

In step S101 of FIG. 6, the measuring unit 233 of the vehicle 20 measures the first number of operations of the first component 231 and the second numbers of operations of the second components 232.

In step S102 of FIG. 6, the controller 22 of the vehicle 20 sends the first number of operations and the second numbers of operations to the information processing apparatus 10 via the communication device 21.

In step S201 of FIG. 7, the control unit 15 of the information processing apparatus 10 acquires the first number of operations and the second numbers of operations, sent from the vehicle 20, via the communication unit 11.

In step S202 of FIG. 7, the control unit 15 of the information processing apparatus 10 determines whether the first component 231 has been replaced based on the acquired first number of operations and second numbers of operations and the first cumulative number of operations and the second cumulative numbers of operations, stored in the storage unit 12.

When the control unit 15 of the information processing apparatus 10 determines that the first component 231 has been replaced (YES in step S202), the control unit 15 updates the first cumulative number of operations and the second cumulative numbers of operations, stored in the storage unit 12, in accordance with the first procedure. In other words, the control unit 15 updates the first cumulative number of operations with the first number of operations acquired this time. In addition, the control unit 15 updates the second cumulative number of operations by adding the second numbers of operations acquired this time to the second cumulative numbers of operations stored in the storage unit 12, respectively.

When the control unit 15 of the information processing apparatus 10 determines that the first component 231 has not been replaced (NO in step S202), the control unit 15 updates the first cumulative number of operations and the second cumulative numbers of operations, stored in the storage unit 12, in accordance with the second procedure. In other words, the control unit 15 updates the first cumulative number of operations with the first number of operations acquired this time. In addition, the control unit 15 updates the second cumulative numbers of operations with the second numbers of operations acquired this time, respectively.

As described above, in the information processing system 1 according to the present embodiment, the vehicle 20 includes the first component 231 including the measuring unit 233 that measures the number of operations of the first component 231, the at least one second component 232 of which the number of operations is measured by the measuring unit 233 of the first component 231, and the controller 22 that sends the first number of operations and the second number of operations to the information processing apparatus 10. The information processing apparatus 10 includes the storage unit 12 and the control unit 15. The storage unit 12 stores the first cumulative number of operations and the second cumulative number of operations. The control unit 15 determines whether any one of the first component 231 and the at least one second component 232 has been replaced based on the first number of operations and the second number of operations, acquired from the vehicle 20. The control unit 15 updates the first cumulative number of operations and the second cumulative number of operations, stored in the storage unit 12, in a procedure that varies according to a result of the determination. Therefore, even when, for example, the second number of operations that is the number of operations of the at least one second component 232 is reset because the first component 231 has been replaced although the at least one second component 232 has not been replaced, it is possible to appropriately update the second cumulative number of operations that is the cumulative number of operations of the at least one second component 232. Therefore, with the information processing system 1 according to the present embodiment, it is possible to appropriately determine when to replace the components of the vehicle 20 based on the appropriately updated first cumulative number of operations and second cumulative number of operations.

The disclosure is not limited to the above-described embodiment. For example, the plurality of blocks shown in the block diagrams may be integrated or one block may be divided. Instead of executing a plurality of steps described in the flowchart in time sequence in accordance with the description, the steps may be executed in parallel or in different order in accordance with the processing capacity of an apparatus that executes steps or as needed. Modifications are possible without departing from the purport of the disclosure.

For example, in the above-described embodiment, one or some of the processing operations executed in the information processing apparatus 10 may be executed in the vehicle 20. For example, in the above-described embodiment, one or some of the processing operations executed in the vehicle 20 may be executed in the information processing apparatus 10.

For example, a general-purpose electronic instrument, such as a smartphone and a computer, may be configured to function as the information processing apparatus 10 according to the above-described embodiment. Specifically, it is conceivable that a program describing process details for implementing functions of the information processing apparatus 10 or the like according to the embodiment is stored in a memory (storage medium) of an electronic instrument, and the program is read and run by a processor of the electronic instrument. Therefore, the disclosure according to one embodiment may be implemented as a program executable on a processor.

What is claimed is:

1. An information processing system comprising:

a vehicle; and an information processing apparatus, wherein:

the vehicle includes a first component including a measuring unit configured to measure the number of operations of the first component, at least one second component of which the number of operations is measured by the measuring unit of the first component, and a controller configured to send a first number of operations indicating the number of operations of the first component and a second number of operations indicating the number of operations of the at least one second component to the information processing apparatus;

the information processing apparatus includes a storage unit configured to store a first cumulative number of operations indicating a cumulative number of operations of the first component and a second cumulative number of operations indicating a cumulative number of operations of the at least one second component, and a control unit, and the control unit is configured to determine whether the first component and the at least one second component have been replaced based on the first number of operations and the second number of operations, acquired from the vehicle, and update the first cumulative number of operations and the second cumulative number of operations, stored in the storage unit, in a procedure that varies according to a result of the determination.

2. The information processing system according to claim 1, wherein the control unit is configured to determine that the first component has been replaced when the first number of operations acquired this time is less than the first number of operations acquired last time and the second number of operations acquired this time is less than the second number of operations acquired last time.

3. The information processing system according to claim 1, wherein the control unit is configured to determine that the at least one second component has been replaced when, of the at least one second component, there is any second component of which the second number of operations acquired this time is less than the second number of operations acquired last time and the first number of operations acquired this time is greater than the first number of operations acquired last time.

4. The information processing system according to claim 1, wherein the control unit is configured to, when the control unit determines that the first component has been replaced, update the first cumulative number of operations with the first number of operations acquired this time, and update the second cumulative number of operations by adding the second number of operations acquired this time to the second cumulative number of operations.

5. The information processing system according to claim 1, wherein the control unit is configured to, when the control unit determines that the second component has been replaced, update the first cumulative number of operations with the first number of operations acquired this time, and update the second cumulative number of operations with the second number of operations acquired this time.

6. The information processing system according to claim 1, wherein the controller is configured to periodically send the first number of operations and the second number of operations to the information processing apparatus.

7. The information processing system according to claim 1, wherein the control unit is configured to determine when to replace the first component by comparing the first cumulative number of operations with a durability value of the first component, and determine when to replace the second component by comparing the second cumulative number of operations with a durability value of the second component.

8. A non-transitory storage medium storing a program used in an information processing system including a vehicle and an information processing apparatus, wherein:

the vehicle includes a first component including a measuring unit configured to measure the number of operations of the first component, and at least one second component of which the number of operations is measured by the measuring unit of the first component, the program causing a computer to execute functions, the functions comprising:

storing a first cumulative number of operations indicating a cumulative number of operations of the first component and a second cumulative number of operations indicating a cumulative number of operations of the at least one second component;

acquiring a first number of operations indicating the number of operations of the first component and a second number of operations indicating the number of operations of the at least one second component from the vehicle;

determining whether the first component and the at least one second component have been replaced based on the first number of operations and the second number of operations, acquired from the vehicle; and updating the first cumulative number of operations and the second cumulative number of operations, stored in the storage unit, in a procedure that varies according to a result of the determination.

9. The storage medium according to claim 8, wherein the functions further comprise determining that the first component has been replaced when the first number of operations acquired this time is less than the first number of operations acquired last time and the second number of operations acquired this time is less than the second number of operations acquired last time.

10. The storage medium according to claim 8, wherein the functions further comprise determining that the second component has been replaced when, of the at least one second component, there is any second component of which the second number of operations acquired this time is less than the second number of operations acquired last time and the first number of operations acquired this time is greater than the first number of operations acquired last time.

11. The storage medium according to claim 8, wherein the functions further comprise:

when it is determined that the first component has been replaced, updating the first cumulative number of operations with the first number of operations acquired this time; and updating the second cumulative number of operations by adding the second number of operations acquired this time to the second cumulative number of operations.

12. The storage medium according to claim 8, wherein the functions further comprise:

when it is determined that the second component has been replaced, updating the first cumulative number of operations with the first number of operations acquired this time; and updating the second cumulative number of operations with the second number of operations acquired this time.

13. The storage medium according to claim 8, wherein the functions further comprise periodically acquiring the first number of operations and the second number of operations.

14. The storage medium according to claim 8, wherein the functions further comprise:

determining when to replace the first component by comparing the first cumulative number of operations with a durability value of the first component; and determining when to replace the second component by comparing the second cumulative number of operations with a durability value of the second component.

15. An information processing method used in an information processing system including a vehicle and an information processing apparatus, wherein the vehicle includes a first component including a measuring unit configured to measure the number of operations of the first component, and at least one second component of which the number of operations is measured by the measuring unit of the first component, the information processing method comprising:

storing a first cumulative number of operations indicating a cumulative number of operations of the first component and a second cumulative number of operations indicating a cumulative number of operations of the at least one second component;

acquiring a first number of operations indicating the number of operations of the first component and a second number of operations indicating the number of operations of the at least one second component from the vehicle;

determining whether the first component and the at least one second component have been replaced based on the first number of operations and the second number of operations, acquired from the vehicle; and updating the first cumulative number of operations and the second cumulative number of operations, stored in the storage unit, in a procedure that varies according to a result of the determination.

16. The information processing method according to claim 15, further comprising determining that the first component has been replaced when the first number of operations acquired this time is less than the first number of operations acquired last time and the second number of operations acquired this time is less than the second number of operations acquired last time.

17. The information processing method according to claim 15, further comprising determining that the second component has been replaced when, of the at least one second component, there is any second component of which the second number of operations acquired this time is less than the second number of operations acquired last time and the first number of operations acquired this time is greater than the first number of operations acquired last time.

18. The information processing method according to claim 15, further comprising:

when it is determined that the first component has been replaced, updating the first cumulative number of operations with the first number of operations acquired this time; and update the second cumulative number of operations by adding the second number of operations acquired this time to the second cumulative number of operations.

19. The information processing method according to claim 15, further comprising:

when it is determined that the second component has been replaced, updating the first cumulative number of operations with the first number of operations acquired this time; and updating the second cumulative number of operations with the second number of operations acquired this time.

20. The information processing method according to claim 15, further comprising periodically acquiring the first number of operations and the second number of operations.

* * * * *